United States Patent
Konagayoshi et al.

(10) Patent No.: US 11,718,803 B2
(45) Date of Patent: Aug. 8, 2023

(54) COOLING WALL, GASIFIER, INTEGRATED GASIFICATION COMBINED CYCLE, AND MANUFACTURING METHOD OF COOLING WALL

(71) Applicant: Mitsubishi Power, Ltd., Yokohama (JP)

(72) Inventors: Yuta Konagayoshi, Kanagawa (JP); Makoto Toyomaru, Kanagawa (JP); Kengo Muroya, Kanagawa (JP); Fumihiro Chuman, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 150 days.

(21) Appl. No.: 17/270,586

(22) PCT Filed: Nov. 7, 2019

(86) PCT No.: PCT/JP2019/043627
§ 371 (c)(1),
(2) Date: Feb. 23, 2021

(87) PCT Pub. No.: WO2020/100705
PCT Pub. Date: May 22, 2020

(65) Prior Publication Data
US 2021/0388277 A1  Dec. 16, 2021

(30) Foreign Application Priority Data
Nov. 12, 2018  (JP) ................. 2018-212150

(51) Int. Cl.
*C10J 3/76* (2006.01)
*C10J 3/48* (2006.01)
*F23M 5/08* (2006.01)

(52) U.S. Cl.
CPC .............. *C10J 3/76* (2013.01); *C10J 3/485* (2013.01); *C10J 2200/09* (2013.01); *C10J 2300/1223* (2013.01); *C10J 2300/1653* (2013.01)

(58) Field of Classification Search
CPC . C10J 3/485; C10J 3/76; C10J 2200/09; C10J 2200/152; C10J 3/74; C10J 3/86; C10J 2300/1223; C10J 3/845; F23M 5/08
See application file for complete search history.

(56) References Cited

U.S. PATENT DOCUMENTS

| | | | |
|---|---|---|---|
| 4,067,682 A * | 1/1978 | Lado ..................... | F23D 11/44 431/11 |
| 4,098,324 A * | 7/1978 | Kummel ................. | C10J 3/78 165/104.31 |

(Continued)

FOREIGN PATENT DOCUMENTS

| | | |
|---|---|---|
| JP | S60-122613 U | 8/1985 |
| JP | S63-075405 A | 4/1988 |

(Continued)

OTHER PUBLICATIONS

Machine Translation of JP2017155971 (Year: 2017).*

(Continued)

*Primary Examiner* — Imran Akram
(74) *Attorney, Agent, or Firm* — WHDA, LLP (57) ABSTRACT

A cooling wall includes: a wall surface defined by arrangement of central axes of a plurality of cooling tubes; and an opening formed in a part of the wall surface in which a burner is installable, each of the plurality of cooling tubes forming the opening has a straight portion and a curved portion, the plurality of cooling tubes include a first cooling tube whose first virtual axis extending in an axial direction of the straight portion overlaps the opening, and a second cooling tube whose second virtual axis extending in an axial (Continued)

direction of the straight portion is located outside an outer circumference of the opening in a radial direction, the curved portion of the first cooling tube is arranged so as to form a curve along the outer circumference surface of the opening and on a surface along the wall surface.

9 Claims, 6 Drawing Sheets

(56) References Cited

U.S. PATENT DOCUMENTS

| | | | | |
|---|---|---|---|---|
| 4,141,213 | A | * | 2/1979 | Ross .................. F02C 7/264 60/737 |
| 4,157,244 | A | * | 6/1979 | Gernhardt ............... C10J 3/30 96/372 |
| 4,188,915 | A | * | 2/1980 | Kummel ............. F22B 1/1884 122/6 A |
| 4,707,163 | A | * | 11/1987 | Gudymov ............... C10J 3/74 48/DIG. 2 |
| 2008/0141588 | A1 | * | 6/2008 | Kirchhubel ............ C10J 3/845 48/77 |
| 2021/0207529 | A1 | * | 7/2021 | Haari .................. F22B 1/1846 |

FOREIGN PATENT DOCUMENTS

| | | |
|---|---|---|
| JP | H10-89622 A | 4/1998 |
| JP | 2014-152988 A | 8/2014 |
| JP | 2017-146027 A | 8/2017 |
| JP | 2017-155971 A | 9/2017 |

OTHER PUBLICATIONS

Machine Translation of JP2014152988 (Year: 2014).*
Formal Translation of JP 2014-152988 (Year: 2014).*
International Search Report dated Jan. 28, 2020, issued in counterpart International application No. PCT/JP2019/043627, with English translation. (5 pages).
Written Opinion dated Jan. 28, 2020, issued in counterpart International application No. PCT/JP2019/043627, with English translation. (14 pages).

* cited by examiner

COOLING WALL, GASIFIER, INTEGRATED GASIFICATION COMBINED CYCLE, AND MANUFACTURING METHOD OF COOLING WALL

TECHNICAL FIELD

The present disclosure relates to a cooling wall, a gasifier, an integrated gasification combined cycle, and a manufacturing method of a cooling wall.

BACKGROUND ART

Conventionally known gasification units are carbonaceous fuel gasification units (coal gasification units) that generate a flammable gas by feeding carbonaceous feedstock such as coal to a gasifier and partially combusting and gasifying the carbonaceous feedstock.

For example, a gasifier generates a flammable gas by partially combusting and gasifying pulverized fuel (carbonaceous feedstock), which is pulverized coal made by pulverizing coal supplied inside, and char (unreacted contents and ash contents of coal) by using an oxygen containing gas (air, oxygen). The gasifier has a pressure vessel and a gasifier wall provided inside the pressure vessel.

In the internal space of a gasifier wall, a combustor section, a diffuser section, and a reductor section are formed in this order from the bottom side in the perpendicular direction (that is, the upstream side in a flow direction of a raw syngas). A plurality of burners are inserted and arranged in the gasifier wall in the combustor section.

As disclosed in PTL 1 below, for example, a gasifier wall is structured in a wall-like shape with a plurality of cooling tubes (wall tubes) in which a cooling medium such as water flows through, and the burners are installed surrounded by burner cooling tubes.

CITATION LIST

Patent Literature

{PTL 1}
Japanese Patent Application Laid-Open No. 2014-152988

SUMMARY OF INVENTION

Technical Problem

A gasifier wall has fins formed of metal plates arranged between a plurality of wall tubes (cooling tubes). The wall tubes and the fins are joined to each other by welding (such a configuration also being referred to as membrane structure). This enables effective heat transfer into the wall tubes of the gasifier wall and reduces heat transfer to the outside of the gasifier wall, thereby maintaining airtightness of the internal space inside the gasifier wall. Further, the fin width between two wall tubes is designed to be smaller than or equal to an upper limit value (a predetermined value) taking into account of heat transfer into the wall tubes, thus preventing burnout of the fins.

A plurality of openings in which burners are inserted are formed in a gasifier wall in the combustor section so as to match installation positions of the burners. Each of the openings is formed by bending some of the wall tubes outwardly from the furnace and also in the circumferential direction thereof. Note that the wall tubes are typically arranged as straight tubes without being bent in other regions than the openings. Conventionally, a plurality of wall tubes arranged around an opening are curved by tube bending processing, such that the fin width described above does not exceed the upper limit value and the plurality of wall tubes form a substantially spread truncated cone (a three-dimensional) shape.

Further, to reduce the gap between the burner and the wall tubes, curved wall tubes are arranged, and a seal box is installed outside the furnace with respect to the gasifier wall, thereby preventing gas leakage from the internal space. Furthermore, a refractory material is filled in the seal box.

The plurality of wall tubes arranged around an opening, described above as the conventional art, are arranged curved outwardly from the furnace with respect to the wall surface of a gasifier wall in order to form an opening in which the burner is inserted. Herein, the wall surface refers to a surface or a curved plane formed of straight portions of the plurality of wall tubes. A wall tube closer to the central axis of the burner is curved to a farther position from the wall surface of the gasifier wall, and the plurality of wall tubes surround the burner in a substantially truncated cone shape. The burner inside the substantially truncated cone shape is a portion exposed to a high temperature gas in the furnace internal space, and the tip end of the burner is installed projected to the furnace internal space side with respect to the wall surface portion of the gasifier wall. Thus, a cylindrical burner cooling tube is installed in a state of being wound spirally around the burner separately from the wall tubes, and the cooling tubes prevent a rise in the temperature of the burner.

Further, the shape of the wall tubes forming a substantially truncated cone shape is complex, and requires processing accuracy for ensuring tightness of contact with the outer circumference of the burner. Furthermore, the wall tubes are required to be arranged at high accuracy so that a refractory material inside the seal box is held. In this regard, adequate processing accuracy is required for the wall tubes, and this leads to a problem of increased man-hours.

The present disclosure has been made in view of the above circumstances and intends to provide a cooling wall, a gasifier, an integrated gasification combined cycle, and a manufacturing method of a cooling wall that can reduce a portion arranged inside the furnace wall and exposed to a high temperature gas inside the finance and that can simplify the structure of an opening.

Solution to Problem

A cooling wall according to a first aspect of the present disclosure includes: a wall surface defined by arrangement of central axes of a plurality of cooling tubes in which a cooling medium flows; and an opening formed in a part of the wall surface in which a burner is inserted and installable. Each of the plurality of cooling tubes forming the opening has a straight portion and a curved portion. The plurality of cooling tubes include a first cooling tube whose first virtual axis extending in an axial direction of the straight portion overlaps the opening, and a second cooling tube whose second virtual axis extending in an axial direction of the straight portion is located outside an outer circumference surface of the opening in a radial direction. The curved portion of the first cooling tube is arranged so as to form a curve along the outer circumference of the opening and on a surface along the wall surface, or arranged so as to be spaced apart by a predetermined distance or less from the wall surface in a direction orthogonal to the wall surface and form a curve. The curved portion of the second cooling tube is arranged so as to be spaced apart from the first cooling tube in a direction orthogonal to the wall surface and form a curve.

Accordingly, the opening can be formed to be surrounded by the plurality of first cooling tubes along the wall surface without requiring the first cooling tubes to be formed in a complex curved shape. The burner is then inserted in the opening and installed with respect to the first cooling tubes arranged inside the wall surface as a boundary. Further, the second cooling tube can avoid interference with the first cooling tubes without requiring the second cooling tubes to be formed in a complex curved shape. It is therefore possible to simplify the structure of the opening compared to the conventional configuration in which curved portions of cooling tubes are projected from the wall surface and arranged in a substantially truncated cone shape.

In the first aspect described above, the curved portion of the first cooling tube may be arranged spaced apart from the wall surface in a direction orthogonal to the wall surface with the predetermined distance being less than or equal to a pitch of the same length as a diameter of the first cooling tube.

According to the above configuration, the curved portions of the first cooling tubes are arranged spaced apart from the wall surface, this enables easier arrangement of the first cooling tubes without requiring the gap of fins provided between the plurality of first cooling tubes to be wider than or equal to the predetermined gap, and it is therefore possible to decrease a reduction in the amount of heat transfer of the first cooling tubes.

In the first aspect described above, a fin may be arranged between the plurality of cooling tubes, the wall surface may be formed in a cylindrical shape, and a combustion gas may be generated by the burner inside with respect to the wall surface.

According to the above configuration, each fin is arranged between the plurality of cooling tubes, and the wall surface is formed in a cylindrical shape. A combustion gas is generated by the burner inside the furnace with respect to the wall surface. Thus, in the burner, the portion exposed to a high temperature combustion gas is reduced compared to the conventional configuration in which curved portions of cooling tubes are projected from the wall surface and arranged in a substantially truncated cone shape.

In the first aspect described above, the curved portions of a plurality of first cooling tubes may be arranged on a surface along the wall surface.

According to the above configuration, the plurality of first cooling tubes are arranged on a surface along the wall surface, and the opening is easily formed.

In the first aspect described above, the curved portions of a plurality of second cooling tubes may be arranged outside the wall surface in a radial direction with respect to the first cooling tube.

According to the above configuration, the plurality of second cooling tubes are arranged outside in the radial direction of the wall surface with respect to the plurality of first cooling tubes, and the opening is easily formed.

In the first aspect described above, a closed portion installed inside with respect to the wall surface around the opening and including a refractory material may be further provided.

According to the above configuration, the closed portion has the refractory material and is installed inside the wall surface around the opening, and a decrease in heat transfer in the cooling wall reduces constraint of the fin width provided between cooling tubes. This enables planar bending structure, and the opening is easily formed.

In the first aspect described above, the cooling wall may further include a closed vessel installed outside with respect to the wall surface around the opening and connected to an outside of the wall surface and the burner and a refractory material may be filled in the closed vessel.

According to the above configuration, the refractory material is filled in the closed vessel, the closed vessel is installed between the burner and the outside of the furnace on the wall surface and the burner around the opening, thereby preventing combustion gas leakage from the space inside the furnace with respect to the wall surface.

In the first aspect described above, the refractory material in the closed vessel may be spaced apart from a burner cooling tube installed around the burner, and the closed vessel may be arranged in a detachable manner.

According to the above configuration, the refractory material in the closed vessel is arranged spaced apart from the burner cooling tube without close contact, and this enables easier replacement when removing the burner cooling tube from the refractory material.

A gasifier according to a second aspect of the present disclosure has the cooling wall of the above first aspect.

An integrated gasification combined cycle according to a third aspect of the present disclosure includes: a gasification unit that generates a raw syngas by combusting and gasifying carbonaceous feedstock and that has the cooling wall according to the above first aspect; a gas turbine rotationally driven by at least partial combustion of a raw syngas generated by the gasification unit; a steam turbine rotationally driven by steam generated by a heat recovery steam generator that introduces a turbine flue gas discharged from the gas turbine; and a generator coupled to a rotary drive of the gas turbine and/or the steam turbine.

A manufacturing method of a cooling wall according to a fourth aspect of the present disclosure includes steps of: defining a wall surface by arranging central axes of a plurality of cooling tubes in which a cooling medium flows; and forming an opening in which a burner is inserted and installable by using the plurality of cooling tubes each having a straight portion and a curved portion. The step of forming the opening includes steps of arranging a first cooling tube whose first virtual axis extending in an axial direction of the straight portion overlaps the opening such that the curved portion of the first cooling tube forms a curve along an outer circumference surface of the opening and on a surface along the wall surface, or arranging the first cooling tube such that the curved portion of the first cooling tube is spaced apart by a predetermined distance or less from the wall surface in a direction orthogonal to the wall surface and forms a curve, and arranging a second cooling tube whose second virtual axis extending in an axial direction of the straight portion is located outside the outer circumference of the opening in a radial direction such that the curved portion of the second cooling tube is spaced apart from the first cooling tube in a direction orthogonal to the wall surface and forms a curve.

Advantageous Effects of Invention

According to the present disclosure, it is possible to reduce a portion arranged in a furnace wall and exposed to a high temperature gas in a furnace and simplify the structure of an opening.

DESCRIPTION OF EMBODIMENTS

Figure 4:
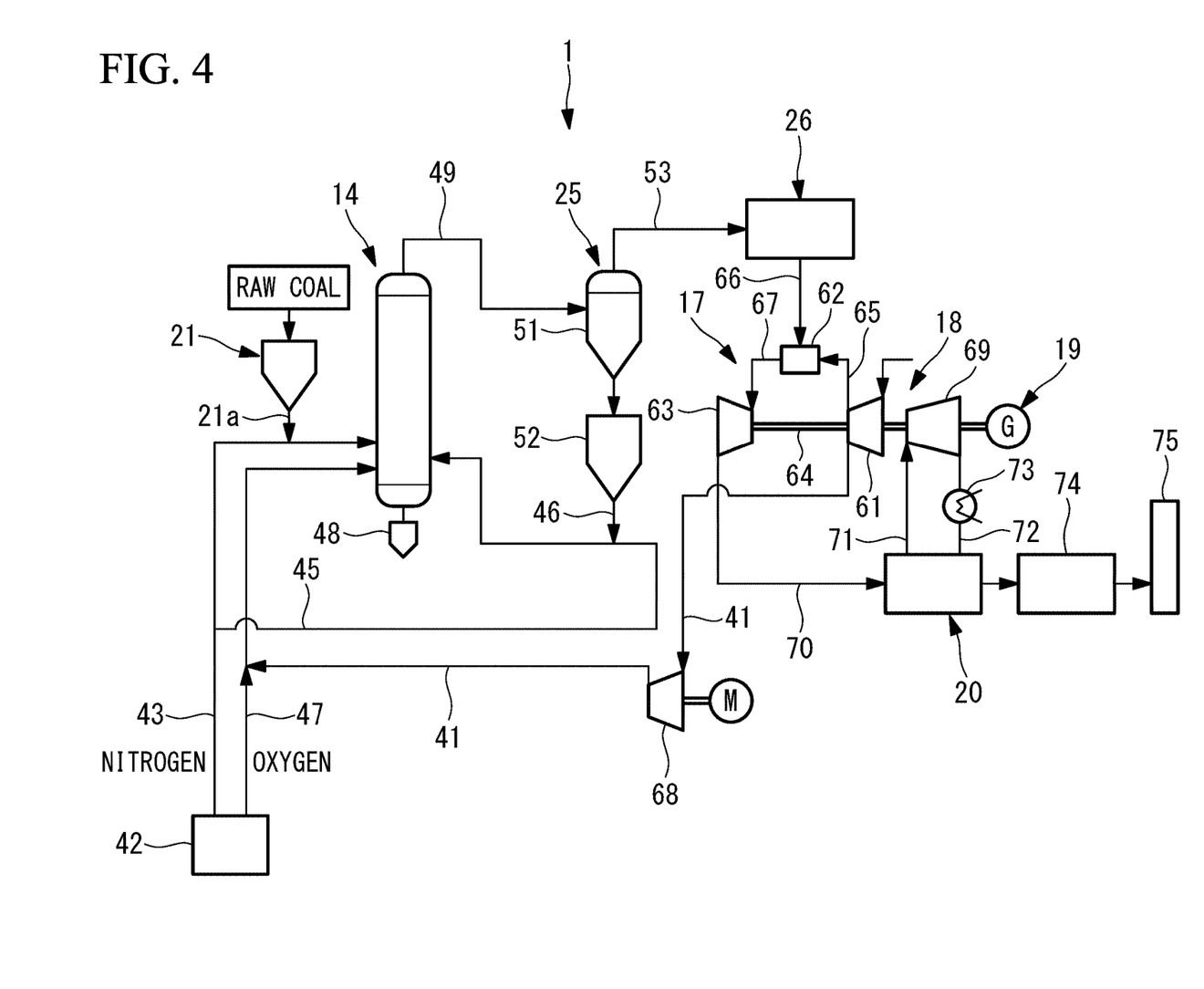
FIG. 4 illustrates a general configuration of an integrated coal gasification combined cycle according to one embodiment of the present disclosure.

One embodiment of the present disclosure will be described below with reference to the drawings. FIG. 4 is a schematic configuration diagram of an integrated coal gasification combined cycle to which a gasification unit according to the present embodiment is applied.

Note that, in the following, the positional relationships of respective components described using expressions of upper and lower represent the perpendicularly upper side and the perpendicularly lower side, respectively.

An integrated coal gasification combined cycle (IGCC) 1 to which a gasification unit 14 according to the present embodiment is applied uses air as an oxygen containing gas and employs an air combustion system to generate a flammable gas (raw syngas) from fuel in the gasification unit 14. In the integrated coal gasification combined cycle 1, the raw syngas generated in the gasification unit 14 is purified by a gas clean-up unit 26 to produce a fuel gas, and then the fuel gas is supplied to a gas turbine 17 to generate power. Thus, the integrated coal gasification combined cycle 1 of the first embodiment is a power unit of an air combustion (air blow) system. As a fuel supplied to the gasification unit 14, carbonaceous feedstock such as coal is used, for example.

As illustrated in FIG. 4, the integrated coal gasification combined cycle (integrated gasification combined cycle) 1 has a coal feed unit 21, the gasification unit 14, a char recovery unit 25, the gas clean-up unit 26, the gas turbine 17, a steam turbine 18, a generator 19, and a heat recovery steam generator (HRSG) 20.

The coal feed unit 21 is supplied with coal that is carbonaceous feedstock as raw coal and produces pulverized coal pulverized into fine particles by pulverizing the coal by using a coal pulverizer (not illustrated) or the like. The pulverized coal produced by the coal feed unit 21 is pressurized by a nitrogen gas as a carrier inert gas supplied from an air separation unit 42 described later at the outlet of a coal feed line 21a, and the pressurized coal is supplied to the gasification unit 14. The inert gas refers to an inert gas having an oxygen content of around 5% by volume or less and is represented by a nitrogen gas, a carbon dioxide gas, an argon gas, or the like but not necessarily limited to around 5% by volume or less.

The pulverized coal produced by the coal feed unit 21 is supplied to the gasification unit 14, and char (unreacted contents and ash contents of coal) recovered by the char recovery unit 25 is returned and supplied to the gasification unit 14 in a reusable manner.

Further, a compressed air feed line 41 from the gas turbine 17 (a compressor 61) is connected to the gasification unit 14, and the gas pressure of a part of a compressed air compressed by the gas turbine 17 can be boosted to a predetermined pressure by a gas booster 68 and supplied to a gasifier 101. The air separation unit 42 separates and generates nitrogen and oxygen from atmospheric air, and the air separation unit 42 and the gasification unit 14 are connected to each other via a first nitrogen feed line 43. Further, the coal feed line 21a from the coal feed unit 21 is connected to the first nitrogen feed line 43. Further, a second nitrogen feed line 45 branched from the first nitrogen feed line 43 is also connected to the gasification unit 14, and a char return line 46 from the char recovery unit 25 is connected to the second nitrogen feed line 45. Furthermore, the air separation unit 42 is connected to the compressed air feed line 41 via an oxygen feed line 47. Further, nitrogen separated by the air separation unit 42 flows through the first nitrogen feed line 43 and the second nitrogen feed line 45 and is thereby used as a carrier gas for coal or char. Further, oxygen separated by the air separation unit 42 flows through the oxygen feed line 47 and the compressed air feed line 41 and is thereby used as an oxygen containing gas in the gasification unit 14.

Figure 5:
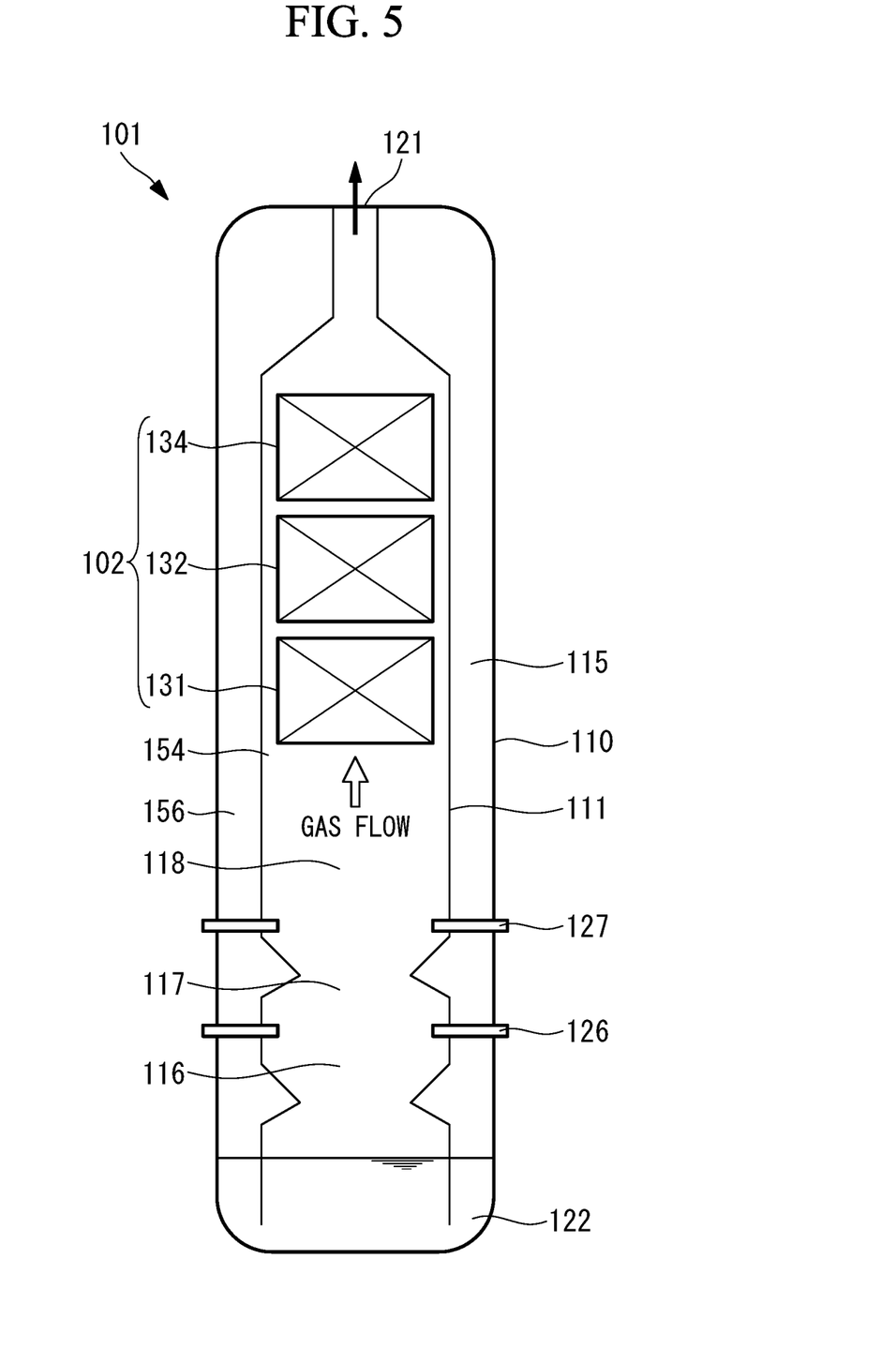
FIG. 5 is a schematic configuration diagram illustrating a gasifier according to one embodiment of the present disclosure.

The gasification unit 14 has a gasifier 101 in a form of a two-step entrained bed (see FIG. 5), for example. The gasification unit 14 produces a raw syngas by partially combusting and gasifying coal (pulverized coal) and char supplied therein with an oxygen containing gas (air, oxygen). Note that a foreign material removal unit 48 that removes a foreign material (slag) mixed in pulverized coal is provided to the gasification unit 14. Further, a raw syngas line 49 that supplies a raw syngas to the char recovery unit 25 is connected to the gasification unit 14, and a raw syngas containing char can be discharged. In such a case, as illustrated in FIG. 5, a syngas cooler 102 (a gas cooler) may be provided to the raw syngas line 49 to feed a raw syngas to the char recovery unit 25 after cooling to a predetermined temperature.

The char recovery unit 25 has a dust collector unit 51 and a feed hopper 52. In such a case, the dust collector unit 51 is formed of one or a plurality of cyclones or porous filters and can separate char contained in the raw syngas generated by the gasification unit 14. The raw syngas from which char has been separated is then fed to the gas clean-up unit 26 through a gas discharge line 53. The feed hopper 52 stores char separated from the raw syngas by the dust collector unit 51. Note that a bin may be arranged between the dust collector unit 51 and the feed hopper 52, and a plurality of feed bathes 52 may be connected to the bin. Further, the char return line 46 from the feed hopper 52 is connected to the second nitrogen feed line 45.

The gas clean-up unit 26 removes impurities such as a sulfur compound or a nitrogen compound to perform gas purification on the raw syngas from which char has been separated by the char recovery unit 25. The gas clean-up unit 26 then purifies a raw syngas to produce a fuel gas and supplies this fuel gas to the gas turbine 17. Note that, since a sulfur component (such as H2S) is still contained in the raw syngas from which char has been separated, the sulfur component is removed and recovered by using an amine absorption liquid or the like and effectively used in the gas clean-up unit 26.

The gas turbine 17 has a compressor 61, a combustor 62, and a turbine 63, and the compressor 61 and the turbine 63 are coupled by a rotary shaft 64. A compressed air feed line 65 from the compressor 61, a fuel gas feed line 66 from the gas clean-up unit 26, and a combustion gas feed line 67 extending to the turbine 63 are connected to the combustor 62. Further, the compressed air feed line 41 extending from the compressor 61 to the gasification unit 14 is provided to the gas turbine 17, and a gas booster 68 is provided in a middle part. Therefore, in the combustor 62, a part of the compressed air supplied from the compressor 61 and at least a part of the fuel gas supplied from the gas clean-up unit 26 are mixed and combusted to generate a combustion gas, and the generated combustion gas is supplied to the turbine 63. The turbine 63 then rotates and drives the generator 19 by rotating and driving the rotary shaft 64 by using the supplied combustion gas.

The steam turbine 18 has a turbine 69 coupled to the rotary shaft 64 of the gas turbine 17, and the generator 19 is coupled to the base end of the rotary shaft 64. The heat recovery steam generator 20 is connected to a flue gas line 70 from the gas turbine 17 (turbine 63) and generates steam by exchanging heat between feedwater and a flue gas from the turbine 63. Further, a steam feed line 71 and a steam recovery line 72 are provided between the heat recovery steam generator 20 and the turbine 69 of the steam turbine 18, and a condenser 73 is provided to the steam recovery line 72. Further, the steam generated by the heat recovery steam generator 20 may include steam generated through heat exchange with the raw syngas by a syngas cooler 102 of the gasifier 101. Therefore, in the steam turbine 18, the turbine 69 is rotationally driven by the steam supplied from the heat recovery steam generator 20, the rotary shaft 64 is rotated in response, and thereby the generator 19 is rotationally driven.

Further, a gas purification unit 74 is provided between the outlet of the heat recovery steam generator 20 and a stack 75.

The operation of the integrated coal gasification combined cycle 1 of the present embodiment will now be described.

In the integrated coal gasification combined cycle 1 of the present embodiment, once raw coal (coal) is supplied to the coal feed unit 21, the coal is changed to pulverized coal by being pulverized into fine particles in the coal feed unit 21. The pulverized coal produced by the coal feed unit 21 flows through the first nitrogen feed line 43 with nitrogen supplied from the air separation unit 42 and is supplied to the gasification unit 14. Further, char recovered by the char recovery unit 25 described later flows through the second nitrogen feed line 45 with nitrogen supplied from the air separation unit 42 and is supplied to the gasification unit 14. Furthermore, after the gas pressure of a compressed air extracted from the gas turbine 17 described later is boosted by the gas booster 68, the boosted compressed air is supplied to the gasification unit 14 through the compressed air feed line 41 together with oxygen supplied from the air separation unit 42.

In the gasification unit 14, the supplied pulverized coal and char are combusted with the compressed air (oxygen), the pulverized coal and char are gasified, and thereby a raw syngas is generated. This raw syngas is then discharged from the gasification unit 14 through the raw syngas line 49 and fed to the char recovery unit 25.

In the char recovery unit 25, first, the raw syngas is supplied to the dust collector unit 51, and thereby pulverized char contained in the raw syngas is separated. The raw syngas from which char has been separated is then fed to the gas clean-up unit 26 through the gas discharge line 53. On the other hand, the pulverized char separated from the raw syngas is deposited in the feed hopper 52, returned to the gasification unit 14 through the char return line 46, and recycled.

The raw syngas from which char has been separated by the char recovery unit 25 is subjected to gas purification in which impurities such as a sulfur compound or a nitrogen compound are removed, and a fuel gas is produced in the gas clean-up unit 26. The compressor 61 generates and supplies a compressed air to the combustor 62. The combustor 62 generates a combustion gas by mixing and combusting the compressed air supplied from the compressor 61 and the fuel gas supplied from the gas clean-up unit 26. The turbine 63 is rotationally driven by this combustion gas, and thereby the compressor 61 and the generator 19 are rotationally driven via the rotary shaft 64. In such a way, the gas turbine 17 can generate power.

The heat recovery steam generator 20 then generates steam by exchanging heat between feedwater and a flue gas discharged from the turbine 63 in the gas turbine 17 and supplies this generated steam to the steam turbine 18. The steam turbine 18 uses the steam supplied from the heat recovery steam generator 20 to rotationally drive the turbine 69 and thereby rotationally drive the generator 19 via the rotary shaft 64, so that power can be generated.

Note that the gas turbine 17 and the steam turbine 18 may have different shafts to rotationally drive a plurality of generators instead of sharing the same shaft to rotationally drive the single generator 19.

Then, in the gas purification unit 74, hazardous substances in the exhaust gas discharged from the heat recovery steam generator 20 are removed, and the purified exhaust gas is emitted from the stack 75 to the atmospheric air.

The gasifier according to the present embodiment will be described below with reference to the drawings. FIG. 5 illustrates a schematic configuration diagram of the gasifier according to the present embodiment. The burner according to the present embodiment is provided to the gasifier 101 or the like illustrated in FIG. 5.

The gasifier 101 is formed extending in the perpendicular direction, pulverized coal and oxygen are supplied on the lower side in the perpendicular direction, and a partially combusted and gasified raw syngas flows through from the lower side to the upper side in the perpendicular direction. The gasifier 101 has a pressure vessel 110 and a gasifier wall (a cooling wall) 111 provided inside the pressure vessel 110. Further, the gasifier 101 forms an annulus section 115 in the space between the pressure vessel 110 and the gasifier wall 111. Further, the gasifier 101 forms a combustor section 116, a diffuser section 117, and a reductor section 118 in this order from the lower side in the perpendicular direction (that is, the upstream side in the flow direction of the raw syngas) in the space inside the gasifier wall 111.

The pressure vessel 110 is formed in a cylindrical shape having an internal hollow space, and a gas discharge port 121 is formed at the upper end, while a slag bath 122 is formed at the lower end (bottom). The gasifier wall 111 is formed in a cylindrical shape having an internal hollow space, and the wall surface thereof is provided facing the inner surface of the pressure vessel 110. In the present embodiment, the pressure vessel 110 has a cylindrical shape, and the diffuser section 117 of the gasifier wall 111 is also formed in a cylindrical shape. Further, the gasifier wall 111 is coupled to the inner surface of the pressure vessel 110 by a support member (not illustrated).

The gasifier wall 111 separates the inside of the pressure vessel 110 into an internal space 154 and an external space 156. The gasifier wall 111 is shaped such that the transverse sectional shape changes at the diffuser section 117 between the combustor section 116 and the reductor section 118, which will be described later. The gasifier wall 111 is configured such that the upper end on the perpendicularly upper side is connected to the gas discharge port 121 of the pressure vessel 110 and the lower end on the perpendicularly lower side is provided apart from the bottom of the pressure vessel 110 with spacing. Further, storage water is stored in the slag bath 122 formed at the bottom of the pressure vessel 110, and immersion of the lower end of the gasifier wall 111 in the storage water seals the inside and the outside of the gasifier wall 111 from each other. Burners 126 and 127 are inserted in the gasifier wall 111, and the syngas cooler 102 is arranged in the internal space 154. The structure of the gasifier wall 111 will be described later.

The annulus section 115 is a space formed between the inside of the pressure vessel 110 and the outside of the gasifier wall 111, that is, the external space 156. The annulus section 115 is supplied with nitrogen, which is an inert gas separated by the air separation unit, through a nitrogen feed line (not illustrated). Thus, the annulus section 115 is a space filled with nitrogen. Note that an in-wall pressure equalizer tube (not illustrated) for equalizing the pressure inside the gasifier 101 is provided near the upper part in the perpendicular direction of the annulus section 115. The in-wall pressure equalizer tube is provided to communicate between the inside and the outside of the gasifier wall 111 and caused to have a substantially even pressure so that the pressure difference between the inside (the combustor section 116, the diffuser section 117, and the reductor section 118) and the outside (the annulus section 115) of the gasifier wall 111 is within a predetermined pressure.

The combustor section 116 is a space used for partially combusting pulverized coal and char with air, and a combustion device formed of the plurality of burners 126 is arranged in the gasifier wall 111 in the combustor section 116. A high temperature combustion gas resulted from partial combustion of the pulverized coal and the char in the combustor section 116 passes through the diffuser section 117 and flows into the reductor section 118.

The reductor section 118 is a space maintained in a high temperature required for a gasification reaction. In the reductor section 118, pulverized coal is supplied in the combustion gas from the combustor section 116 and partially combusted. The pulverized coal is decomposed into volatile components (carbon oxide, hydrogen, lower hydrocarbon, or the like) and gasified to generate a raw syngas. A combustion device formed of the plurality of burners 127 are arranged in the gasifier wall 111 in the reductor section 118.

The syngas cooler 102 is provided inside the gasifier wall 111 and provided on the upper side in the perpendicular direction of the burners 127 of the reductor section 118. The syngas cooler 102 is a heat exchanger in which an evaporator 131, a superheater 132, and an economizer 134 are arranged in this order from the lower side in the perpendicular direction of the gasifier wall 111 (the upstream side of the flow direction of the raw syngas). The syngas cooler 102 cools the raw syngas by exchanging heat with the raw syngas generated in the reductor section 118. Further, each quantity of the evaporator 131, the superheater 132, and the economizer 134 is not limited to that illustrated in the drawing.

The operation of the gasifier 101 described above will now be described.

In the gasifier 101, nitrogen and pulverized coal are supplied and ignited by the burners 127 of the reductor section 118, and pulverized coal, char, and compressed air (oxygen) are supplied and ignited by the burners 126 of the combustor section 116. In response, a high temperature combustion gas occurs in the combustor section 116 due to combustion of the pulverized coal and the char. Further, in the combustor section 116, melted slag is generated in the high temperature gas due to the combustion of the pulverized coal and the char. This melted slag attaches to the gasifier wall 111, drops to the furnace bottom, and is finally discharged to the storage water in the slag bath 122. The high temperature combustion gas generated in the combustor section 116 then passes through the diffuser section 117 and rises to the reductor section 118. In the reductor section 118 maintained in a high temperature state required for a gasification reaction, pulverized coal is mixed to the high temperature combustion gas, and the pulverized coal is partially combusted under a high temperature reduction atmosphere to cause a gasification reaction, so that a raw syngas is generated. The gasified raw syngas flows through from the lower side to the upper side in the perpendicular direction.

Figure 1:
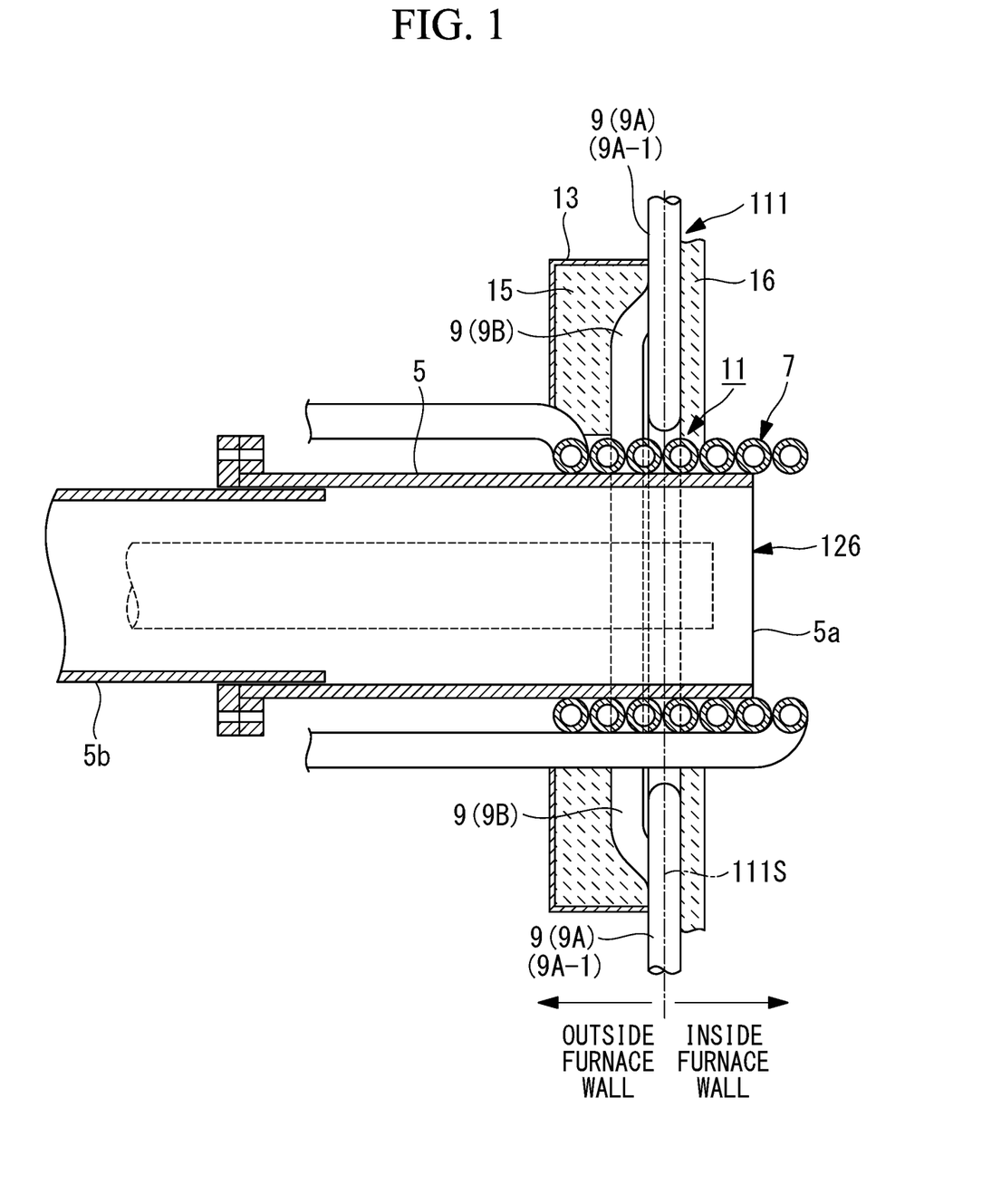
FIG. 1 is a vertical sectional view illustrating a gasifier wall according to one embodiment of the present disclosure and illustrates an opening in a gasifier wall in which a burner is installed.
Figure 2:
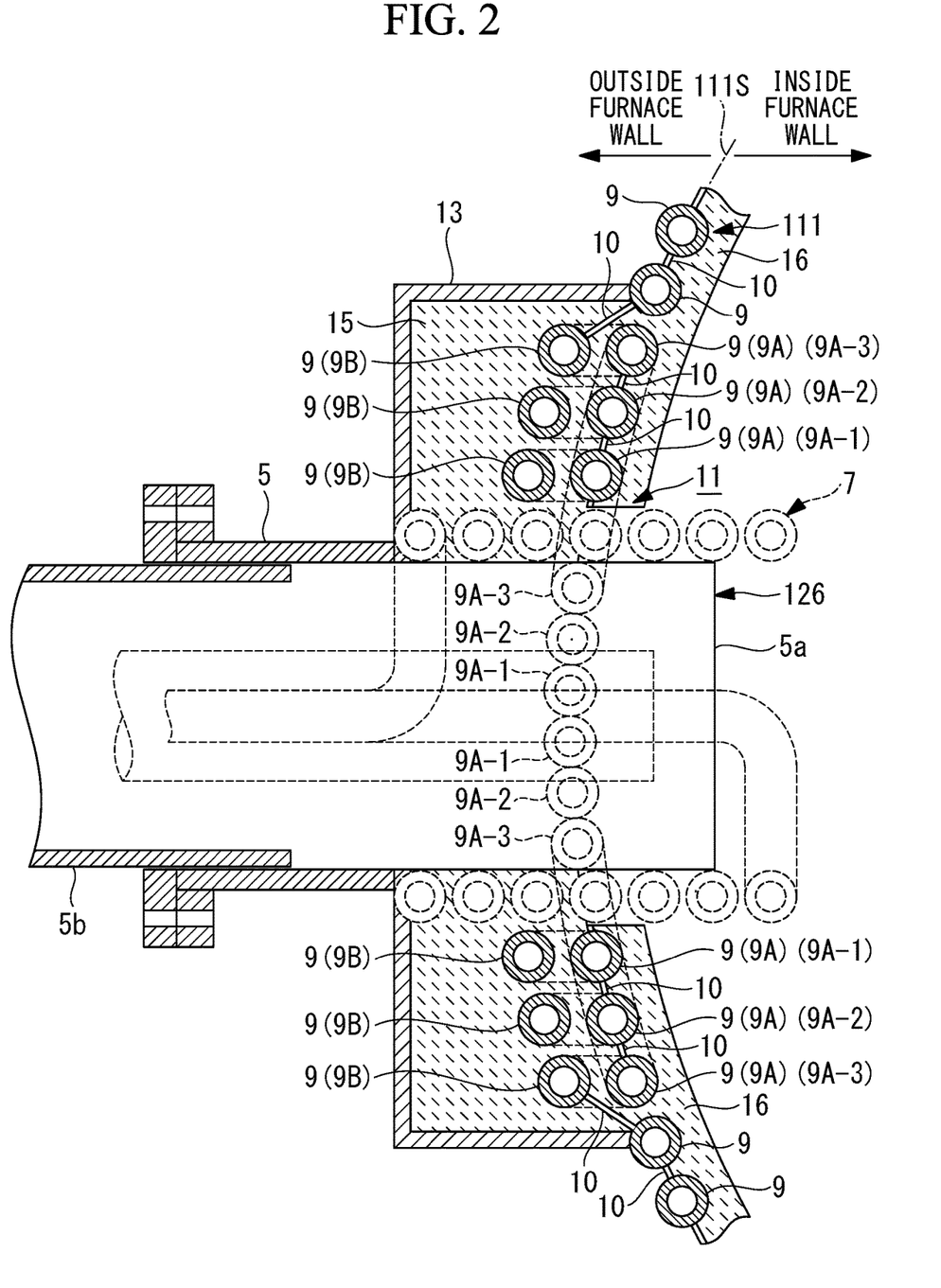
FIG. 2 is a transverse sectional view illustrating a gasifier wall according to one embodiment of the present disclosure and illustrates an opening in a gasifier wall in which a burner is installed.
Figure 3:
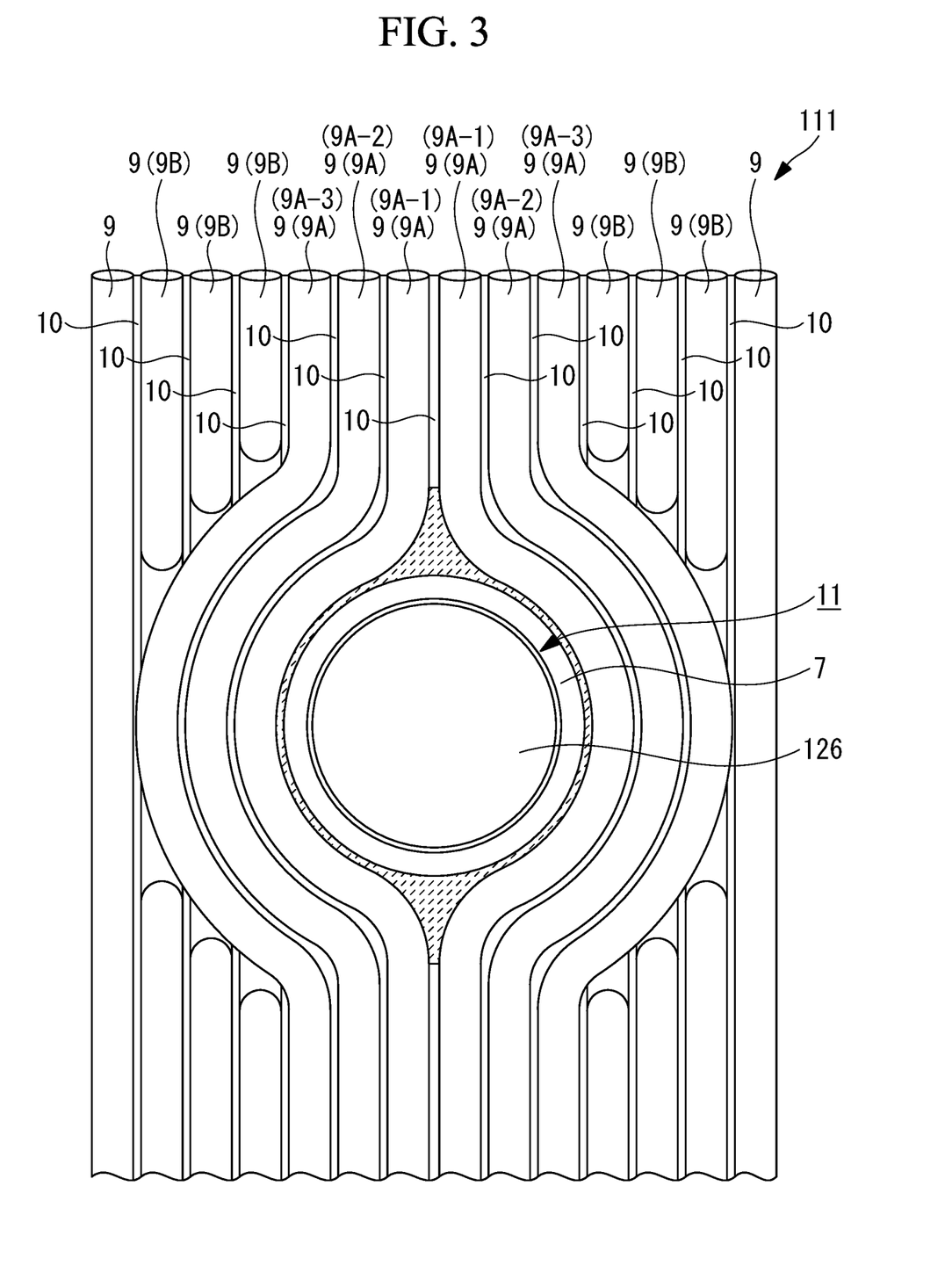
FIG. 3 is a front view illustrating a gasifier wall according to one embodiment of the present disclosure.

The plurality of burners 126 are provided around the combustor section 116, and one of the burners 126 is illustrated in FIG. 1 to FIG. 3. The gasifier wall 111 is formed such that a plurality of wall tubes 9 are arranged to form a cylindrical shape. The positions along which central axes of straight portions of the plurality of wall tubes 9 are arranged in succession in the circumferential direction define a wall surface 111S. The burner 126 is inserted and installed in an opening 11 formed in the gasifier wall 111. The gasifier wall 111 is formed of the plurality of wall tubes (cooling tubes) 9 provided in parallel extending in the vertical direction and fins 10 connecting adjacent wall tubes 9 to each other. Cooling water flows in the wall tubes 9. The opening 11 formed in the gasifier wall 111 is formed with some of the wall tubes 9 being bent.

Specifically, first wall tubes 9A that are some of the wall tubes 9 are formed in a curved shape along the position of the wall surface 111S outside in the radial direction of the burner 126 so that no wall tube 9 is arranged in a region corresponding to the opening 11. The adjacent first wall tubes 9A are also formed in a curved shape in order, thereby to form the opening 11 as illustrated in FIG. 3.

The burner 126 has a burner body 5 arranged from outside the furnace wall to inside the furnace wall, and a burner cooling tube 7 wound around the burner body 5. Pulverized fuel such as pulverized coal or air (primary air or secondary air) flows through inside the burner body 5. Flame is formed inside the furnace wall by the pulverized fuel and the air supplied from the burner body 5, so that a combustion gas is generated.

Cooling water (cooling medium) flows through inside the burner cooling tube 7. The burner cooling tube 7 is arranged so as to surround the burner body 5 along the outer circumference surface of the burner body 5 in order to obtain heat transfer. The installation region of the burner cooling tube 7 is provided from a tip end 5a of the burner body 5 to the gasifier wall 111 side, more specifically, from the tip end 5a of the burner body 5 to a position close to the opening 11 and slightly outside the furnace wall than the opening 11.

The burner 126 with the configuration described above is used as follows.

Pulverized fuel and air are supplied from a feed source (not illustrated) into the burner body 5, and a mixed gas adjusted and mixed at a predetermined air ratio inside the burner body 5 is ejected from the tip end 5a of the burner body 5. The mixed gas ejected from the burner body 5 is supplied to an already-formed fuel region inside the furnace wall, and a desired combustion state is maintained.

To protect the burner body 5 from combustion heat due to flame formed in the furnace wall, cooling water is caused to flow inside the burner cooling tube 7. The cooling water is supplied from a cooling water source (not illustrated) to the burner cooling tube 7 and caused to flow from the tip end 5*a* side of the burner body 5 to the base end 5*b* side.

Next, the structure of the opening of the gasifier wall 111 according to the present embodiment will be described.

The opening 11 formed in the gasifier wall 111 is formed with some of the wall tubes 9 being bent as described above. Specifically, a part of the wall tube 9 at a position corresponding to the opening 11 is formed in a curved shape to the side direction of the burner 126. Adjacent wall tubes 9 are also formed in a curved shape in order, thereby to form the opening 11 as illustrated in FIG. 3.

The plurality of wall tubes 9 are arranged in the perpendicularly vertical direction so that the straight portions are parallel to each other in a region where the inner diameter of the cylindrical gasifier wall 111 is constant, and thereby the gasifier wall 111 is formed. The gasifier wall 111 has, for example, an annular transverse section taken along the direction orthogonal to the perpendicularly vertical direction.

Out of the plurality of wall tubes 9 forming the gasifier wall 111, a plurality of wall tubes 9 near the opening 11 each have straight portions and a curved portion. Each curved portion is provided in the first wall tube (first cooling tube) 9A whose virtual axis (first virtual axis) extending in the axial direction of the straight portion overlaps the opening 11. To form the opening 11 through which the burner 126 can be inserted and installed, each of the first wall tubes 9A has a curved shape curved with respect to the axial direction of the straight portion. The opening 11 is formed so as to be surrounded by the first wall tubes 9A curved in order along the outer circumference surfaces of the first wall tubes 9A corresponding to the plurality of curved portions.

The number of first wall tubes 9A whose virtual axes extending in the axial direction of the straight portions overlap the opening 11 differs in accordance with the size of the opening 11 or the diameter, the pitch, or the like of the wall tubes 9. The plurality of first wall tubes 9A are arranged such that the curved portions are arranged in the wall surface along the wall tubes 9. The first wall tube 9A is formed of the planar bending structure. Accordingly, the opening 11 is easily formed such that the plurality of wall tubes 9 surround the opening 11 without requiring a complex curved shape of the first wall tubes 9A to be formed.

The plurality of first wall tubes 9A include first wall tubes 9A-1 whose first virtual axes extending in the axial directions of the straight portions overlap a position closest to the central axis of the opening 11. The opening 11 is formed such that each curved portion of the first wall tube 9A-1 is installed along the outermost circumference surface of the burner 126 at the position closest to the outer circumference surface of the burner 126. First wall tubes 9A-2 whose virtual axes extending in the axial directions of the straight portions overlap the second closest position to the central axis of the opening 11 are installed such that each curved portion is more spaced apart outwardly in the radial direction from the central axis of the burner 126 than the first wall tube 9A-1 forming the opening 11 at the position closest to the outer circumference surface of the burner 126 described above. The first wall tubes 9A-2 are located adjacent to the first wall tubes 9A-1 installed along the outermost circumference surface of the burner 126.

The first wall tubes 9A (for example, the first wall tubes 9A-3 and 9A-4) whose virtual axes extending in the axial directions of the straight portions pass through the region corresponding to the opening 11 are arranged in order outside in the radial direction of the burner 126 and adjacent to the first wall tubes 9A-2 and 9A-3 located on the center side. Each of these first wall tubes 9A is installed along the shape of the outermost circumference surface of the burner 126, and may be installed such that the center of a virtual circle matching a part of the curved portion of the first wall tube 9A is the same as the center of a virtual circle being in contact with the outermost circumference surface of the burner 126, for example.

Furthermore, the curved portions of the first wall tubes 9A are arranged on a surface along the wall surface 111S that is the position where the central axes of the straight portions of the plurality of wall tubes 9 are arranged in succession. Thus, the burner 126 is arranged inside the furnace and outside the furnace with respect to the first wall tubes 9A arranged along the wall surface 111S as the boundary. Further, the burner 126 is arranged such that a region from the tip end 5*a* of the burner body 5 to a position at which the burner 126 and the wall surface 111S intersect each other is arranged in the internal space of the furnace. Therefore, in the burner body 5 arranged in the internal space of the gasifier 101, a portion exposed to a high temperature combustion gas is smaller than that in the conventional configuration in which the curved portions of the wall tubes 9 are arranged so as to project outside the furnace from the wall surface 111S and form a substantially truncated cone shape.

Figure 6:
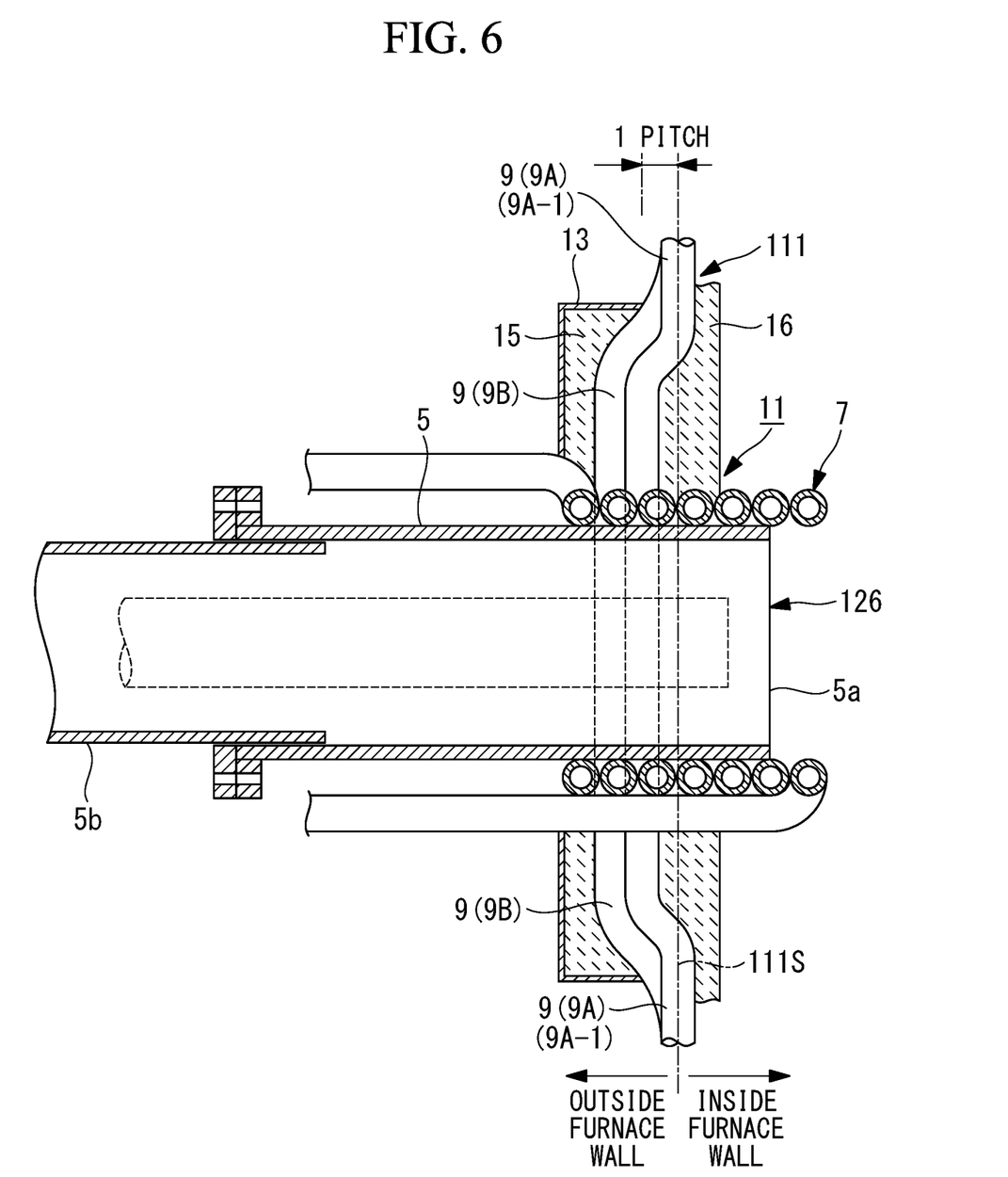
FIG. 6 is a vertical sectional view illustrating a modified example of a gasifier wall according to one embodiment of the present disclosure and illustrates an opening in a gasifier wall in which a burner is installed.

Note that, as illustrated in FIG. 6, the curved portion of the first wall tube 9A is not limited to be arranged along the wall surface 111S of the gasifier wall 111 and may be arranged outside in the radial direction so as to be spaced apart from the wall surface 111S by a predetermined distance or less and spread in the radial direction of the cylindrical gasifier wall 111. In such a case, the predetermined distance is the pitch between the wall surface 111S and the curved portion and is less than or equal to the same length as the diameter of the first wall tube 9A. Thus, the curved portion of the first wall tube 9A may be arranged outside in the radial direction so as to be spaced apart from the wall surface 111S by a distance less than or equal to a pitch of the same length as the diameter of the first wall tube 9A as the predetermined distance.

In the modified example described above, the curved portion of the first wall tube 9A is arranged outside in the radial direction so as to be spaced apart from the wall surface 111S and spread in the radial direction of the cylindrical gasifier wall 111. This enables easier arrangement of the first wall tubes 9A without requiring the gap between the fins 10 provided between the plurality of first wall tubes 9A to be wider than or equal to a predetermined gap, and it is therefore possible to decrease a reduction in the amount of heat transfer of the first wall tubes 9A.

In some of the plurality of wall tubes 9 forming the gasifier wall 111, the virtual axes thereof extending in the axial directions of the straight portions overlap each other on the outer diameter side (outside in the radial direction) of the outer circumference of a region corresponding to the opening 11. Out of these wall tubes 9, if second wall tubes 9B overlapping each other near the opening 11 were arranged only with extension of the straight portions, the second wall tubes 9B would interfere with the first wall tubes 9A described above. Therefore, each second wall tube 9B has a curved shape curved outwardly in the outer diameter side of the opening 11 with respect to the axial direction of the straight portion. The curved portion of the first wall tube 9A is arranged along the wall surface 111S, and the curved portion of the second wall tube 9B is arranged outside the furnace than the first wall tube 9A, thus avoiding interference between the first wall tube 9A and the second wall tube 9B.

The number of second wall tubes 9B differs in accordance with the number of first wall tubes 9A, the curved shape, or the like. In the plurality of second wall tubes 9B, the curved portions are arranged on a surface on the outer diameter side (outside the furnace) of the wall surface 111S with respect to the curved portions of the first wall tubes 9A. Each second wall tube 9B is formed of the planar bending structure. Accordingly, the opening 11 is easily formed without requiring a complex curved shape of the second wall tubes 9B to be formed.

The curved portion of the second wall tube 9B is arranged along the first wall tube 9A and outside the furnace than the first wall tube 9A with respect to the wall surface 111S of the gasifier wall 111. Accordingly, the second wall tube 9B can avoid interference with the first wall tube 9A.

For the curved portions, each fin 10 formed of a metal plate is arranged between two first wall tubes 9A or between two second wall tubes 9B. For the straight portions, each fin 10 is similarly arranged between two wall tubes 9. On the other hand, for the curved portions on extended lines from the straight portions thereof, installation of the fin 10 may be omitted between one first wall tube 9A and one second wall tube 9B adjacent to the one first wall tube 9A.

A closed portion 16 formed of a refractory material is installed inside the furnace with respect to the wall surface 111S around the opening 11. This can reduce heat transfer in the gasifier wall 111 on the circumference of the opening 11. It is thus possible to reduce constraint of each width of the fins 10 provided between the wall tubes 9, the first wall tubes 9A, and the second wall tubes 9B required from heat transfer characteristics, so that the wall tubes 9 are arranged on a surface along the wall surface 111S, and the opening 11 is easily formed.

Further, the closed portion 16 formed of a refractory material can prevent gas leakage from the internal space even when there is a portion with no fin 10 arranged. As the refractory material, an alumina-based material or a SiC-based material may be preferably used, for example.

The closed portion 16 formed of the refractory material may be installed over the overall circumference surface inside the furnace with respect to the wall surface 111S in the combustor section 116, for example, without being limited to the circumference of the opening 11.

A seal box (a closed vessel) 13 is provided so as to cover the opening 11 formed with the wall tubes 9 outside the furnace wall. The seal box 13 is made of stainless steel, for example. A refractory material 15 is filled in the seal box 13. As the refractory material 15, an alumina-based material or a SiC-based material may be preferably used, for example.

Accordingly, it is possible to prevent gas leakage from the internal space around the opening 11 and reduce the amount of heat transfer toward outside the gasifier wall 111. Further, the seal box 13 and the refractory material 15 maintain the increased pressure inside the furnace wall and prevent further leakage of radiant heat or slag or the like that may leak out of the gasifier wall 111 from a gap between the burner 126 and the opening 11.

It is desirable that the refractory material 15 filled in the seal box 13 be spaced apart from the burner cooling tube 7, namely, arranged with a gap provided thereto, without being in close contact with the burner cooling tube 7 installed around the burner body 5. This allows only the burner cooling tube 7 to be detachable and easily replaceable when removing the burner cooling tube 7 from the refractory material 15.

The opening 11 according to the present embodiment described above is formed as follows.

First, the curved portions are formed by planar bending processing so that the first wall tubes 9A and the second wall tubes 9B have predetermined shapes. In the present embodiment, the pipe used for forming the wall tube 9 is not required to be curved or processed in a three-dimensional shape.

As illustrated in FIG. 3, the plurality of wall tubes 9 are arranged such that the straight portions are arranged in parallel to each other in a region in which the inner diameter of the cylindrical gasifier wall 111 is constant. When the transverse section taken along a direction orthogonal to the perpendicularly vertical direction has, for example, an annular shape in the gasifier wall 111, the plurality of wall tubes 9 are arranged such that the straight portions are arranged in an annular shape.

Out of the plurality of wall tubes 9, the first wall tubes 9A whose virtual axes extending in the axial directions of the straight portions overlap a region corresponding to the opening 11 form the opening 11 through which the burner 126 is inserted in an installable manner such that the curved portions surround the outermost circumference surface of the burner 126. Out of the first wall tubes 9A, the first wall tubes 9A-1 whose virtual axes extending in the axial directions of the straight portions are arranged at positions closest to the central axis of the opening 11 are installed along the outer circumference surface of the burner 126 at positions closest to the outermost circumference surface of the burner 126.

In this situation, the curved portions of the first wall tubes 9A-1 are arranged on a surface along the wall surface 111S formed of the straight portions of the plurality of wall tubes 9. Note that, as illustrated in FIG. 6, the curved portions of the first wall tubes 9A may be arranged so as to be spaced apart from the wall surface 111S by a distance less than or equal to a pitch of the same length as the diameter of the first wall tube 9A and spread outwardly in the radial direction of the cylindrical gasifier wall 111.

Next, the first wall tubes 9A-2 whose virtual axes extending in the axial directions of the straight portions pass through the second closest positions from the central axis of the region overlapping the opening 11 are installed along the first wall tubes 9A-1 and outside in the radial direction of the opening 11 than the first wall tubes 9A-1 arranged at positions closest to the outer circumference surface of the burner 126 described above. Further, the first wall tubes 9A-2 are also arranged on a surface along the wall surface 111S formed of the straight portions of the plurality of wall tubes 9 or arranged so as to be spaced apart from the wall surface 111S by a distance less than or equal to a pitch of the same length as the diameter of the first wall tube 9A and spread outwardly in the radial direction of the cylindrical gasifier wall 111.

In such a way, the first wall tubes 9A whose virtual axes extending in the axial directions of the straight portions overlap the region corresponding to the opening 11 are arranged in order outside in the radial direction of the outer circumference surface of the burner 126 and adjacent to the first wall tubes 9A on the central axis side. Each of these first wall tubes 9A may be installed along the outer circumference surface of the burner 126 such that the center of a virtual circle matching a part of the curved portion of the first wall tube 9A is the same as the center of a virtual circle being in contact with the outer circumference surface of the burner 126, for example.

Further, out of the plurality of wall tubes 9, the second wall tubes 9B whose virtual axes extending in the axial directions of the straight portions overlap regions outside in the radial direction of the region corresponding to the opening 11 are arranged. Out of the wall tubes 9, the second wall tubes 9B passing through near the opening 11 are installed such that the first wall tubes 9A are arranged along the wall surface 111S and inside the furnace than the curved portions so as not to interfere with the first wall tubes 9A. In this situation, the second wall tubes 9B are arranged such that the curved portions are arranged along the first wall tubes 9A outside the furnace than the first wall tubes 9A with respect to the wall surface 111S of the gasifier wall 111. Accordingly, interference between the first wall tubes 9A and the second wall tubes 9B is avoided.

Further, the fins 10 are joined by welding to the first wall tubes 9A or the second wall tubes 9B between the plurality of first wall tubes 9A or between the plurality of second wall tubes 9B.

As described above, the first wall tubes 9A and the second wall tubes 9B are arranged, thereby to form the opening 11. The opening 11 is configured such that the burner body 5 and the burner cooling tube 7 can be installed later in the opening 11. The burner cooling tube 7 is fabricated in a cylindrical shape in a different place from the installation site of the gasifier wall 111, and installation operation is performed at the installation site of the gasifier wall 111.

Next, the closed portion 16 formed of a refractory material is installed inside the furnace with respect to the wall surface 111S around the opening 11. Further, the seal box 13 is installed outside the wall surface 111S around the opening 11. After the seal box 13 is installed at a predetermined position, the burner cooling tube 7 is installed inside the seal box 13, and the refractory material 15 is filled in the seal box 13. The refractory material of the closed portion 16 or the refractory material 15 of the seal box 13 is filled by being poured into a mold frame or the seal box 13 and cured at the operation site, for example. The burner body 5 is then inserted in a space surrounded by the burner cooling tube 7, and the burner 126 is installed in the gasifier wall 111.

As described above, according to the present embodiment, unlike the conventional configuration, the curved portions of the wall tubes 9 are not arranged in a substantially truncated cone shape around the opening 11, but the curved portions of the first wall tubes 9A are arranged on a surface along the wall surface 111S formed of the straight portions. As a result, the first wall tubes 9A are arranged around the burner 126 projecting the internal space of the gasifier wall 111, and the range exposed to flame is narrower than that in the conventional arrangement having the substantially truncated cone shape. Thus, the length of the cylindrical burner cooling tube 7 installed along the outer circumference surface of the burner body 5 can also be reduced. A shorter length of the burner cooling tube 7 reduces the number of turns of the pipe. The tightness of contact between the burner body 5 and the burner cooling tube 7 is required to be managed, and the burner cooling tube 7 is required to be formed at high accuracy. Due to the smaller number of turns of a spiral pipe, the operation required to fabricate the burner cooling tube 7 is simplified, and the man-hours are reduced.

Further, as described above, since the range exposed to flame is narrower in the burner body 5 and the burner cooling tube 7 projecting to the internal space of the gasifier wall 111, the metal surface temperature of the burner cooling tube 7 is reduced compared to the conventional configuration. Furthermore, since the length of the burner cooling tube 7 is reduced, a pressure loss of cooling water is also reduced, and the usage life of the burner cooling tube 7 becomes longer.

Note that, although the integrated gasification combined cycle (IGCC) having a coal gasifier that generates a flammable gas from pulverized coal has been described as an example in the above embodiment, the gasification unit of the present disclosure is also applicable to a unit that gasifies other carbonaceous feedstock such as biomass fuel such as thinned wood, waste lumber, driftwood, grasses, waste, sludge, tires, or the like, for example. Further, the gasification unit of the present disclosure is also applicable to a gasifier used for a chemical plant that obtains a desired chemical substance without being limited to that used for power generation.

Furthermore, the cooling wall of the present disclosure is also applicable as a furnace wall of a general boiler.

Further, although coal is used as fuel in the embodiment described above, other carbonaceous feedstock such as high-grade coal or low-grade coal may also be applicable. Further, without being limited to coal, biomass used as reusable biological organic resources may be used, and thinned wood, waste lumber, driftwood, grasses, waste, sludge, tires, and recycle fuel using the above (pellets or chips) or the like as a raw material can also be used, for example.

Note that, although the present embodiment has described a tower type gasifier as the gasifier 101, the embodiment can be implemented in the same manner also when the gasifier 101 is a crossover type gasifier by replacing the perpendicularly vertical direction of respective devices in the gasifier 101 so as to have appropriate gas flow directions of a raw syngas.

REFERENCE SIGNS LIST 1 integrated coal gasification combined cycle (integrated gasification combined cycle)
5 burner body
5a tip end
5b base end
7 burner cooling tube
9 furnace wall tube (cooling tube)
9A, 9A-1, 9A-2, 9A-3 first furnace wall tube (first cooling tube)
9B second furnace wall tube (second cooling tube)
10 fin
11 opening
13 seal box
14 gasification unit
15 refractory material
16 closed portion
17 gas turbine
18 steam turbine 19 generator
20 heat recovery steam generator
21 coal feed unit
21a coal feed line
25 char recovery unit
26 gas clean-up unit
42 air separation unit
48 foreign material removal unit
51 dust collector unit
52 feed hopper
61 compressor 62 combustor
63 turbine
64 rotary shaft
68 gas booster
69 turbine
73 condenser
74 gas purification unit
75 stack
101 gasifier
102 syngas cooler (heat exchanger)
110 pressure vessel
111 gasifier wall (cooling wall)
111S wall surface
115 annulus section
116 combustor section
117 diffuser section
118 reductor section
121 gas discharge outlet
122 slag bath
126, 127 burner

The invention claimed is:

1. A cooling wall comprising:
a wall surface defined by arrangement of central axes of a plurality of cooling tubes in which a cooling medium flows; and
an opening formed in a part of the wall surface in which a burner is inserted and installable,
wherein each of the plurality of cooling tubes forming the opening has a straight portion and a curved portion,
wherein the plurality of cooling tubes include
a first cooling tube whose first virtual axis extending in an axial direction of the straight portion overlaps the opening, and
a second cooling tube whose second virtual axis extending in an axial direction of the straight portion is located outside an outer circumference of the opening in a radial direction,
wherein the curved portion of the first cooling tube is arranged so as to form a curve along the outer circumference surface of the opening and on a surface along the wall surface, or arranged so as to be spaced apart by a predetermined distance or less from the wall surface in a direction orthogonal to the wall surface and form a curve,
wherein the curved portion of the second cooling tube is arranged so as to be spaced apart from the first cooling tube in a direction orthogonal to the wall surface and form a curve, and
wherein the curved portion of the first cooling tube is arranged so as to be spaced apart from the wall surface in a direction orthogonal to the wall surface with the predetermined distance being less than or equal to a pitch of the same length as a diameter of the first cooling tube.

2. The cooling wall according to claim 1,
wherein a fin is arranged between the plurality of cooling tubes,
wherein the wall surface is formed in a cylindrical shape, and
wherein a combustion gas is generated by the burner inside with respect to the wall surface.

3. The cooling wall according to claim 1, wherein the curved portions of a plurality of first cooling tubes are arranged on a surface along the wall surface.

4. The cooling wall according to claim 1, wherein the curved portions of a plurality of second cooling tubes are arranged outside the wall surface in a radial direction with respect to the first cooling tube.

5. The cooling wall according to claim 1 further comprising a closed portion installed inside with respect to the wall surface around the opening and including a refractory material.

6. The cooling wall according to claim 1 further comprising a closed vessel installed outside with respect to the wall surface around the opening and connected to an outside of the wall surface and the burner, wherein a refractory material is filled in the closed vessel.

7. The cooling wall according to claim 6, wherein the refractory material in the closed vessel is arranged so as to be spaced apart from a burner cooling pipe installed around the burner, and the closed vessel is detachable.

8. A gasifier comprising the cooling wall according to claim 1.

9. An integrated gasification combined cycle comprising:
the gasification unit that generates a raw syngas by combusting and gasifying carbonaceous feedstock and has the cooling wall according to claim 1;
a gas turbine rotationally driven by at least partial combustion of a raw syngas generated by the gasification unit;
a steam turbine rotationally driven by steam generated by a heat recovery steam generator that introduces a turbine flue gas discharged from the gas turbine; and
a generator coupled to a rotary drive of the gas turbine and/or the steam turbine.

\* \* \* \* \*